United States Patent [19]

Wolcott

[11] 3,778,160

[45] Dec. 11, 1973

[54] ELECTRONIC DISTANCE MEASURING DEVICE AND METHOD

[75] Inventor: John R. Wolcott, Orlando, Fla.

[73] Assignee: Martin Marietta Corporation, New York, N.Y.

[22] Filed: Dec. 18, 1970

[21] Appl. No.: 99,560

[52] U.S. Cl. .................................. 356/5, 343/12
[51] Int. Cl. ............................................. G01c 3/08
[58] Field of Search .................. 356/5; 343/7.5, 12, 343/14, 17.5

[56] References Cited
UNITED STATES PATENTS

| | | | |
|---|---|---|---|
| 3,542,472 | 11/1970 | Smith-Vaniz | 343/14 |
| 3,649,123 | 3/1972 | Ulicki | 356/5 |
| 3,191,171 | 6/1965 | Zuefeldt | 343/12 R |
| 3,113,309 | 12/1963 | Kuecken | 343/14 |
| 3,577,144 | 5/1971 | Girault | 356/5 |
| 3,522,992 | 8/1970 | Jaffe | 356/5 |

Primary Examiner—Benjamin A. Borchelt
Assistant Examiner—S. C. Buczinski
Attorney—Julian C. Renfro and Gay Chin

[57] ABSTRACT

An electronic distance measuring device and method for determining the distance between two locations utilizing light or other electromagnetic wave energy. The wave energy is transmitted from one location to the other and is reflected back toward the transmitting location. The energy is detected and compared in phase with the transmitted energy, and the phase relationship between the transmitted and detected energy is varied until a predetermined phase relationship exists. The frequency of the transmitted wave energy is then varied until a predetermined phase relationship exists at a different frequency. The difference frequency may then be utilized to provide a direct digital display of distance between the predetermined locations.

16 Claims, 4 Drawing Figures

INVENTOR
JOHN R. WOLCOTT

BY Julian C. Ranfer
ATTORNEY

ELECTRONIC DISTANCE MEASURING DEVICE AND METHOD

BACKGROUND OF THE INVENTION

The present invention relates to electronic distance measuring systems and more specifically to a method and apparatus for making extremely accurate distance measurements between two predetermined geographical locations utilizing light or other electromagnetic wave energy.

When surveying or otherwise measuring distances which need to be determined with extreme accuracy, it is often very difficult or even impossible to measure the distances in a conventional manner, e.g., by "chaining." When "chaining," distance is measured by a crew of from four to six people in short increments using a metallic chain or tape. Depending on the terrain, it may be necessary to compensate for uneven ground and, in fact, it may be impossible to make a direct measurement due to deep canyons or bodies of water. In addition, when "chaining," compensation must be made for variations in temperature, moisture and tape tension. In addition to being slow, this "chaining" method of surveying requires great skill and involves numerous calculations which must be repeatedly checked to avoid errors. Thus, where substantial distance measurements are involved, this method may be considered archaic in view of present day electronic capabilities.

Electronic distance measuring systems have been developed to alleviate the problems associated with "chaining." For example, one known electronic distance measuring device transmits electromagnetic wave energy toward a target and detects the reflected energy. The phase difference between the transmitted and reflected energy is determined and the phase difference is utilized to calculate distance through the use of the following equation:

$$d = nc/2f \qquad (1)$$

Where: $d$ is distance, $c$ is the speed of light, $f$ is the frequency of the transmitted wave energy, and $n$ is the number of wavelengths contained in the transmitted and reflected beam.

The distance $d$ calculated through the use of the above equation is limited in accuracy to the accuracy of the measurement of $n$, i.e., the number of integral and fractional wavelengths in the transmitted and reflected beam of wave energy. The fractional portion of the number $n$ is readily calculated from the measured phase difference. For example, assuming that the transmitted frequency is 1 megahertz and the above described phase comparison results in an indication of a 60° phase difference between the transmitted and reflected wave energy, the fractional portion of $n$ is 60/360 or one-sixth of a wavelength.

However, the ambiguity with respect to the integral number of wavelengths must still be resolved.

To eliminate the range ambiguity in this type of phase comparison system, a number of phase comparisons and phase difference measurements are obtained at various known frequencies. Elimination of the range ambiguity in this manner may add greatly to the size, the number of components, the time required to make the necessary calculations and the expense of the electronic distance measuring device. In addition, since the exact phase difference between the transmitted and reflected wave energy must be measured in order to provide the accuracy required in surveying applications, an extremely accurate phase shifter or time delay must be provided. This adds to the expense of the system and is an additional possible source of error.

While the known electronic distance measuring devices obviate many of the problems associated with "chaining" and other manual surveying techniques, a number of other problems are presented and it is an object of the present invention to provide a novel electronic distance measuring method and apparatus which obviates these and other problems.

It is another object of the present invention to provide a novel method and apparatus for accurately and rapidly measuring and displaying distances electronically.

It is yet another object of the present invention to provide a novel method and apparatus for resolving range ambiguities associated with electronic distance measuring devices.

It is a further object of the present invention to provide a novel electronic distance measuring method and apparatus wherein the transmitted and reflected wave energy is phase locked to facilitate the resolution of range ambiguity.

It is still a further object of the present invention to provide a novel electronic distance measuring method and apparatus wherein a digital display of distance is provided.

It is yet a further object of the present invention to provide a novel method and system for electronic distance measuring having an immediate digital readout.

These and other objects and advantages of the present invention will become apparent to one skilled in the art to which the invention pertains from a perusal of the appended claims and the detailed description when read in conjunction with the attached drawings.

THE DRAWINGS

DETAILED DESCRIPTION

Figure 1:
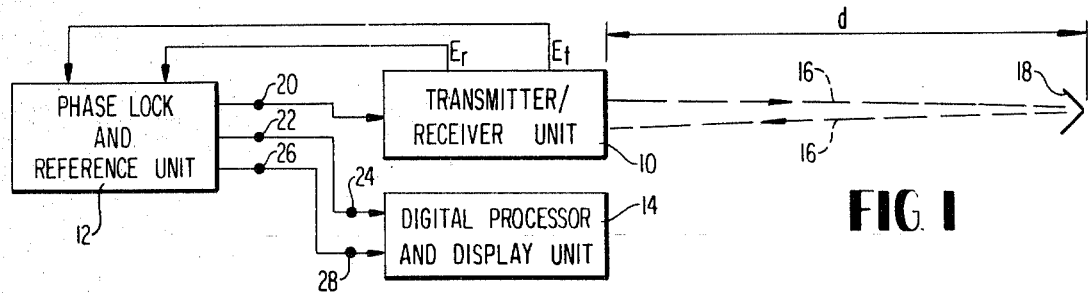
FIG. 1 is a general functional block diagram of the system of the present invention.

The electronic distance measuring system of the present invention is illustrated functionally in the block diagram of FIG. 1. The system generally comprises a transmitter/receiver unit 10, a phase lock and reference unit 12 and a digital processor and display unit 14.

The transmitter/receiver unit 10 may be any conventional transmitter/receiver unit capable of providing a beam 16 of wave energy, e.g., light or other electromagnetic wave energy. The beam 16 may be directed toward a target 18 which reflects the beam 16 back toward the transmitter/receiver 10 where the reflected beam is detected in a conventional manner, for example, by a photo detector or appropriate antenna.

A signal $E_t$ related in frequency and phase to the transmitted wave energy and a signal $E_r$ related in frequency and phase to the received wave energy are applied to the phase lock and reference unit 12 hereinafter described in connection with FIGS. 2–4. The phase lock and reference unit 12 compares the phase of the signal $E_t$ to the phase of the signal $E_r$ and generates a signal which is related to the phase difference therebetween.

The signal related to the phase difference may then be utilized to either automatically vary the phase relationship between the transmitted and received signals until a predetermined relationship exists or to provide an indication of the phase relationship to thereby permit manual variation of the phase relationship until the desired predetermined relationship exists. The phase relationship may be varied, for example, by applying a signal from an output terminal 20 of the phase lock and reference unit 12 to the transmitter/receiver unit 10 to vary the frequency of the transmitted signal. This desired phase relationship may conveniently be 0° phase difference so that an integral number of wavelengths of energy exist in the transmitted and reflected beams.

After phase locking the transmitted and received wave energy at a first transmitted frequency $f_1$, the frequency of the transmitted wave energy utilizing a second transmitted frequency $f_2$ may be varied until a successive phase lock occurs, i.e., the transmitter frequency may be raised or lowered until a comparison between the phases of the transmitted and received wave energy produces the next successive or adjacent indication that the desired phase relationship therebetween exists. The phase lock and reference unit 12 then compares the frequency $f_1$ of the transmitted signal at the first phase lock condition with the frequency $f_2$ of the transmitted signal at the next successive or adjacent phase lock condition and generates a difference frequency $\Delta f$ which is a function only of the distance and known constants.

The difference frequency $\Delta f$ is applied from an output terminal 22 of the phase lock reference unit 12 to an input terminal 24 of the digital processor and display unit 14 so that a precise readout of range may be provided. In addition, the phase lock and reference unit 12 provides an extremely accurate and highly stable reference signal $f_o$ at an output terminal 26 which is applied to the digital processor and display unit 14 via an input terminal 28.

Figure 2:
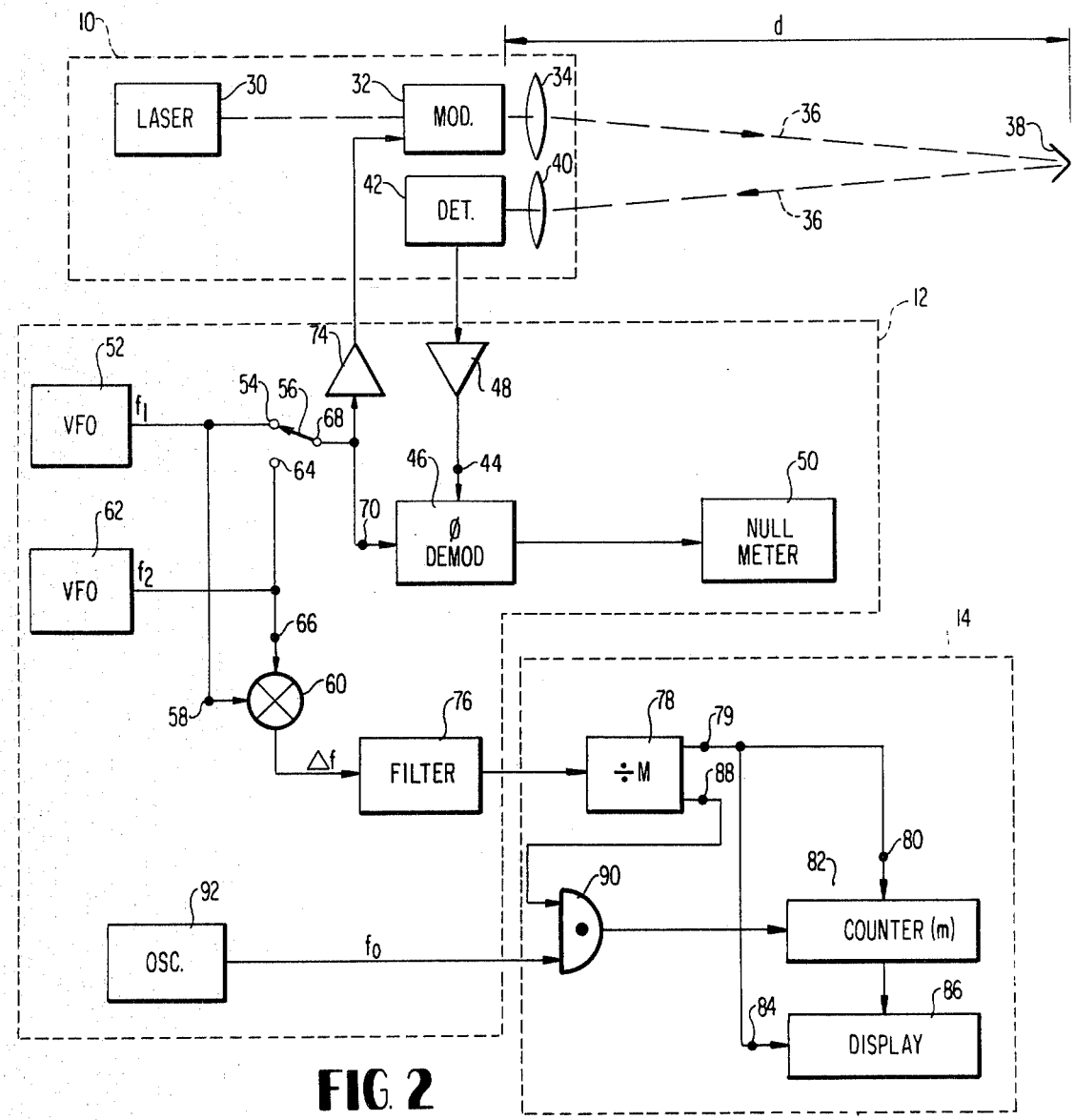
FIG. 2 is a detailed functional block diagram of one embodiment of the electronic distance measuring system of FIG. 1.
Figure 3:
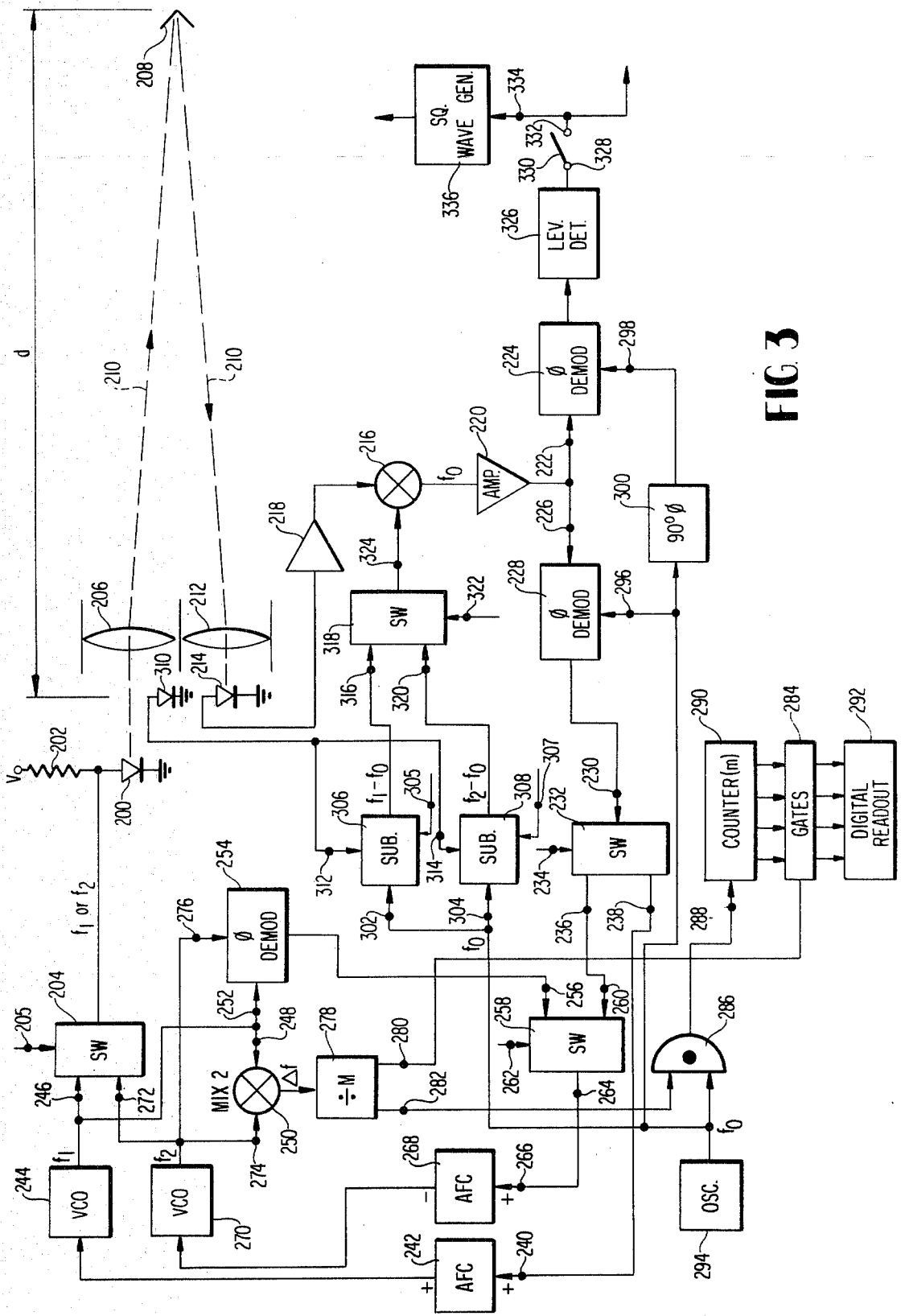
FIG. 3 is a detailed functional block diagram of a second embodiment of the electronic distance measuring system of FIG. 1; and, FIG. 4 is a detailed functional block diagram of a third embodiment of the electronic distance measuring system of FIG. 1.
Figure 4:
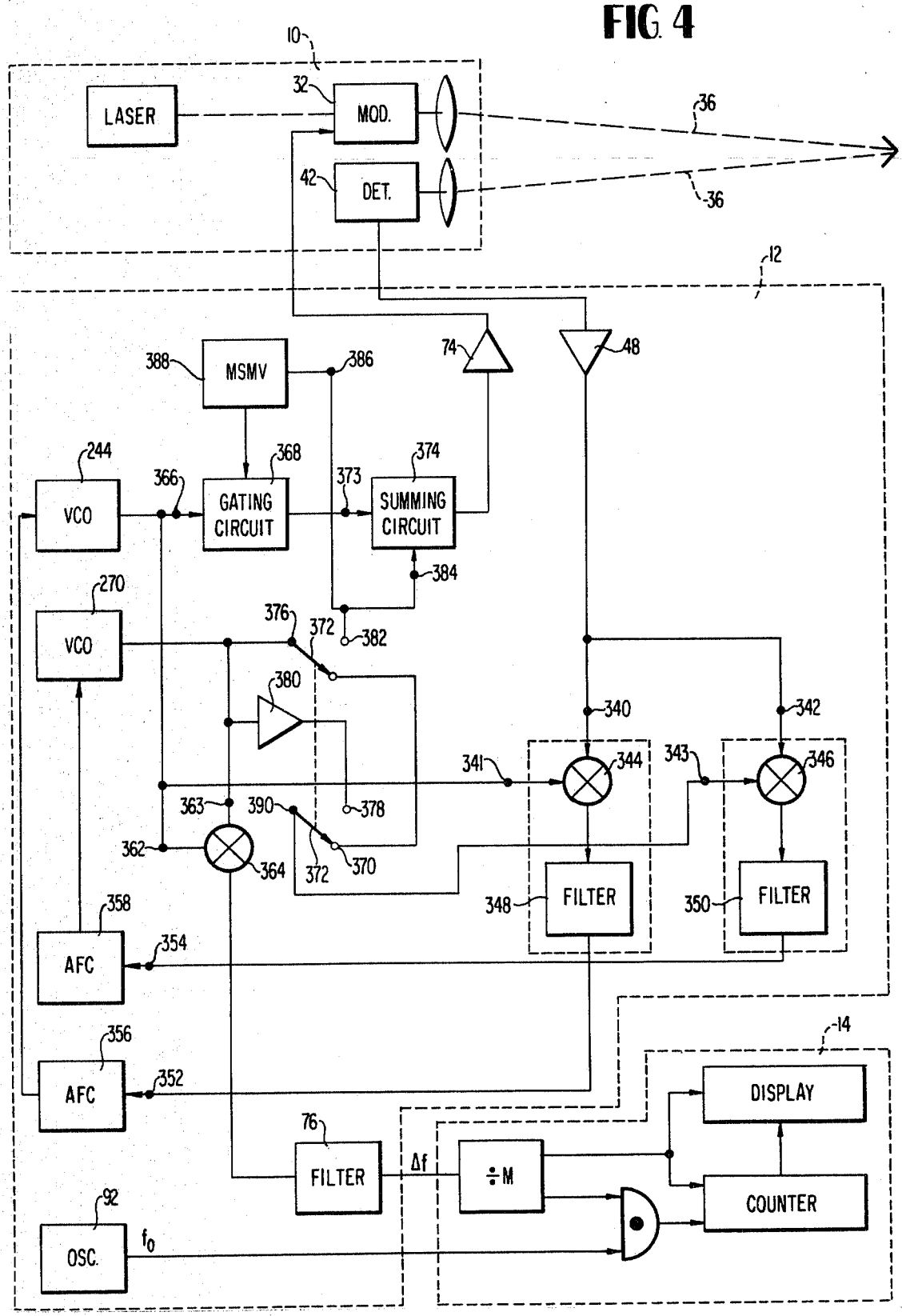

The operation of the electronic distance measuring system of FIG. 1 may be more fully understood from the following general, theoretical system description and, thereafter, a more specific description of the embodiments illustrated in FIGS. 2–4.

With continued reference to FIG. 1, the signals $E_t$ and $E_r$ may be expressed by the following equations:

$$E_t = A_t \sin 2\pi f_1 t \qquad (2)$$

$$E_r = A_r \sin 2\pi f_1 (t - (2d/c)) \qquad (3)$$

Where
$A_t$ is the amplitude of the transmitted wave energy;
$A_r$ is the amplitude of the received wave energy;
$f_1$ is the frequency of the transmitted and received wave energy;
$d$ is the distance from the transmitter/receiver unit to the reflector; and,
$c$ is the speed of light.

Selecting the initial phase lock between the transmitted and received wave energy at a predetermined angular phase difference of 90° or one-quarter wavelength difference, the phase difference between the signals $E_t$ and $E_r$ may be represented as $2\pi f_1(2d/c)$ and may be equated to an integral number of quarter wavelengths. For example, if phase lock occurs at every odd multiple of quarter wavelengths, the phase difference may be expressed as:

$$2\pi f_1 (2d/c) = (2N + 1)(\pi/2) \qquad (4)$$

Where $N$ is any integer including zero.

By varying the frequency of the transmitter wave energy until the next successive or adjacent phase lock occurs, the phase difference between the transmitted and received signals in terms of the integer $N$ and the frequency $f_2$ of the second transmitted energy is given by the equation:

$$2\pi f_2 (2d/c) = (2N + 3)(\pi/2) \qquad (5A)$$

where $f_2$ is greater than $f_1$ or $$2\pi f_2 (2d/c) = (2N - 1)(\pi/2) \qquad (5B)$$

where $f_1$ is greater than $f_2$.

Equations (4) and (5) may be expressed, respectively, in terms of frequency as:

$$f_1 = (2N + 1) c/8 d \qquad (6)$$

and $$f_2 = (2N + 3) c/8 d \qquad (7A)$$

where $f_2 > f_1$ or $$f_2 = (2N - 1) c/8 d \qquad (7B)$$

where $f_1 > f_2$.

The difference $\Delta f$ between the frequency $f_1$ at the initial phase lock condition and the frequency $f_2$ at the adjacent phase lock condition is given by:

$$\Delta f = c/4d \qquad (8)$$

and the distance from the transmitter to the reflector may be expressed as:

$$d = c/4 \Delta f \qquad (9).$$

It can thus be seen that the distance $d$ from the transmitter/receiver unit 10 to the reflector 18 as illustrated in FIG. 1 is related to the difference frequency $\Delta f$. The distance may, therefore, be determined by merely solving equation (9) for $d$ in the digital processor and display unit 14 as will hereinafter be described. From the above, it can be seen that an entirely unambiguous distance measurement is obtained utilizing only the difference frequency $\Delta f$ and appropriate constants.

It may be desirable to display the distance in digital form in terms of a particular linear unit such as the foot. To facilitate this type of digital display, a reference signal having a frequency $f_o$ is applied to the digital processor and display unit 14. By allowing a counter to count the cycles $m$ of the reference signal for a period of time $T$ to generate a time gate determined by the difference frequency $\Delta f$ as will hereinafter be described, the following equations may be utilized to calculate distance:

$$m = f_o T \quad (10)$$

where $$T = M/\Delta f \quad (11)$$

Thus, $$m = \frac{f_o M}{\Delta f} \quad m = \frac{4 f_o M d}{c} \quad (12)$$

where by setting $$M = c/4 f_o \quad (13)$$

where $M$ is a selected constant, typically involving the use of the next adjacent null, the use of which constant in conjunction with the value of $f_o$ enables readout in the units desired, such as in feet or in meters. Thus, the count $m$ is equal to the distance $d$.

It should be understood that the term phase lock or phase lock condition, as utilized throughout the detailed description, refers to the point at which a predetermined phase relationship exists between the transmitted and received wave energy. This predetermined phase relationship may be conveniently selected, for example, as a 90° or 0° phase difference. However, the particular phase difference selected to define the phase lock condition may be any desired angular difference as long as the same phase difference is utilized to define the phase lock condition at both frequencies of the wave energy as previously described.

Furthermore, the two different wave energy frequencies need not be frequencies which provide successive or adjacent phase lock conditions. If desired, frequencies which provide predetermined phase lock conditions separated by any number of intermediate phase lock conditions may be utilized to determine distance. However, it is necessary that a constant related to the number of intermediate phase lock conditions be utilized by the digital processor and display unit 14 to provide the correct distance readout. This is to say, the value of constant $M$ would be different if the next adjacent phase lock is not used.

Referring now to FIG. 2 wherein one embodiment of the distance measuring system of the present invention is illustrated, a continuous wave laser 30 provides a beam of radiant wave energy which may be modulated by a conventional light modulator 32, focused into a narrow beam by a lens system 34 snd transmitted as an amplitude modulated beam 36 of radiant energy toward a reflective target 38. The reflected beam 36 of radiant energy may be focused through another suitable lens system 40 onto a suitable and conventional detector 42 such as a photo diode.

The output signal from the detector 42 is applied to an input terminal 44 of phase demodulator 46 by way of a conventional high gain, low pass amplifier 48 and the output signal from the phase demodulator 46 may be applied to a conventional null meter 50.

The output signal from a first conventional and variable frequency oscillator 52 is applied to one contact 54 of a switch 56 and to an input terminal 58 of a conventional mixer 60. The output signal from a second conventional variable frequency oscillator 62 is applied to a second contact 64 of the switch 56 and to a second input terminal 66 of the mixer 60. The common contact 68 of the switch 56 is connected directly to an input terminal 70 of the phase demodulator 46 and through conventional high gain, low pass amplifier 74 to the modulator 32. The output signal from the mixer 60 is applied through a conventional low pass filter 76 to a conventional divider 78. The output signal from the divider 78 is applied to a reset input terminal 80 of a conventional digital counter 82 and to a reset input terminal 84 of a conventional digital display device 86. A complementary output signal from output terminal 88 of the divider 78 is applied to one input terminal of a two input terminal AND gate 90 and the output signal from a conventional stable reference oscillator 92 is applied to the other input terminal of the AND gate 90.

In operation, the continuous wave signal from the laser 30 is applied to the modulator 32 along with the signal from one of the variable frequency oscillators 52 and 62. The result amplitude modulated laster beam 36 is transmitted toward the reflective target 38 and is reflected therefrom back to the detector 42.

The detector 42 detects the amplitude modulation of the reflected beam 36 and the output signal therefrom related to the detected modulation is applied to the phase demodulator 46 together with the modulating signal. The phase demodulator 46, preferably a quadrature phase comparator, generates a signal related in amplitude and polarity to the phase difference between the two applied signals relative to a 90° or quarter wavelength difference. The frequency of the selected one of the variable frequency oscillators 52 and 62 is then varied until a null is indicated on the null meter 50. When a null is indicated, the transmitted and detected modulation signals may be expressed, respectively, as equations (2) and (3).

The position of the switch 56 is then changed to select the signal from the other of the variable frequency oscillators 52 and 62. The signal from the other of the variable frequency oscillators is applied to the modulator 32 to modulate the continuous wave signal from the laser 30 and the frequency thereof varied until a null is attained on the null meter 50. Additionally, the digital display device 86 provides a zero indication. When these conditions are met, the frequencies of both variable frequency oscillators 52 and 62 are identical since the difference frequency $\Delta f$ applied to the divider 78, subsequently described, is zero.

The frequency of one of the variable frequency oscillators is then varied either increasingly or decreasingly until the next successive or adjacent null is indicated on the null meter 50. The output signal from the mixer 60, which generally comprises a plurality of signals having frequencies $f_1, f_2, f_1 + f_2$ and $f_1 - f_2$, is applied to the filter 76 which is designed to pass only signals having a frequency lower than either $f_1$ or $f_2$, i.e., the difference frequency $f_1-f_2$ or $\Delta f$. The output signal from the filter circuit 76 is applied to the divider 78 where the frequency $\Delta f$ thereof is divided by the constant $M$ as determined from equation (13). At the beginning of each dividing or counting cycle of the divider 78, the output signal from the output terminal 79 of the divider 78 simultaneously transfers the count from the counter 82 into the display device 86 and resets the counter 82. The output signal from the output terminal 88 of the divider 78 enables the AND gate 90 which allows the signal from the oscillator 92 to be applied to the counter 82 over a time interval T given by equation (11).

By selecting $M$ so that the units $m$ are in, for example, feet, the display unit 86 will display the distance between the transmitter/receiver unit 10 and the reflector 38 in the selected units, e.g., feet. The system $d$ may be modified for other units by an adjustment of the value of $M$ in the divider 78. The variable frequencies $f_1$ and $f_2$ may be obtained from a frequency synthesizer driven by the output signal at a frequency $f_o$ from the oscillator 92.

Another embodiment of the present invention is illustrated in FIG. 3 and provides automatic determination of distance between two predetermined geographical locations.

With reference now to FIG. 3, a laser is indicated schematically at 200. The laser 200 may be a solid state gallium arsenide laser having an anode electrode connected to a suitable voltage source V through a resistor 202 and a grounded cathode electrode. The generated laser beam 210 is amplitude modulated in accordance with the output signal from an electronic switching circuit 204.

The amplitude modulated laser beam 210 is directed through a suitable conventional lens 206 toward a reflective target 208 located at the position to which a distance measurement is desired. The transmitted laser beam strikes the target 208 and is reflected back through a suitable conventional lens 212 to strike a conventional light detector 214. The light detector 214 may be, for example, a conventional grounded cathode semiconductor photo diode. The output signal from the light detector 214, e.g. a signal taken from the anode electrode of the photo diode, is applied to a mixer 216 by way of a conventional signal amplifier 218 and the output signal from the mixer 216 is applied through a conventional signal amplifier 220 to an input terminal 222 of the phase demodulator 224 and to an input terminal 226 of a phase demodulator 228. The output signal from the phase demodulator 228 is applied to an input terminal 230 of a conventional electronic switch 232. When the switch 232 is enabled by a signal applied to an input terminal 234, the signal from the phase demodulator 228 is provided at an output terminal 236 of the switch 232. When the switch 232 is not enabled, the output signal from the phase demodulator 228 is provided at an output terminal 238 of the switch 232.

The output terminal 238 of the switch 232 is connected to an input terminal 240 of a conventional automatic frequency control circuit 242 and the output signal from the automatic frequency control circuit 242 is applied to a conventional voltage controller/oscillator 244. The output signal from the oscillator 244 is applied to an input terminal 246 of the electronic switch 204, to an input terminal 248 of a conventional mixer 250, and to an input terminal 252 of a conventional phase demodulator 254. The output signal from the phase demodulator 254 is applied to an input terminal 256 of a conventional electronic switch 258, a second input terminal 260 of which is connected to the output terminal 236 of the electronic switch 232.

When enabled by an appropriate signal at an input terminal 262, the electronic switch 258 provides the signal at the input terminal 260 at an output terminal 264. When not enabled, the switch 258 provides the signal at the input terminal 256 at the output terminal 264.

The output terminal 264 of the switch 258 is connected to an input terminal 266 of a conventional automatic frequency control circuit 268, and the output signal from the automatic frequency control circuit 268 is applied to a conventional voltage controlled oscillator 270. The output signal from the oscillator 270 is applied to an input terminal 272 of the electronic switch 204, to an input terminal 274 of the mixer 250, and to an input terminal 276 of the phase demodulator 254.

The output signal from the mixer 250 is applied to a divide by M divider or counter 278 and the output signals from the divider 278 are applied to one input terminal of an AND gate 286 and respectively via output terminals 280 and 282 to a plurality of logic gates 284. The output signal from the AND gate 286 is applied to the trigger input terminal 288 of a counter 290 which is in turn connected to a digital readout device 292 through the gates 284.

A highly stable oscillator 294, such as a crystal controlled oscillator, provides an output signal having a frequency $f_o$ which is applied to the other input terminal of the AND gate 286, to input terminal 296 of the phase demodulator 228, to an input terminal 298 of the phase demodulator 224 by way of a 90° phase shifter 300, and to input terminals 302 and 304 of conventional phase lock or frequency substractor circuits 306 and 308, respectively. The beam of radiant energy from the laser 200 is detected by a reference light detector 310 which may be similar to the detector 214 previously described. The output signal from the reference detector 310 is applied to a second input terminal 312 of the phase lock circuit 306 and to a second input terminal 314 of the phase lock circuit 308. The output signal from the phase lock circuit 306 is applied to one input terminal 316 of a conventional electronic switch 318 and the output signal from the phase lock circuit 308 is applied to an input terminal 320 of the switch 318.

The switch 318 is enabled by the application of an appropriate signal to an input terminal 322, and when enabled, the signal applied to the input terminal 320 thereof is provided at an output terminal 324. When not enabled, the signal at the input terminal 316 is provided at the output terminal 324 of the switch 318. The output signal from the output terminal 324 of the switch 318 is applied to the mixer 216 and the output signal therefrom applied to the input terminal 226 of the phase demodulator 228 and to the input terminal 222 of the phase demodulator 224 by way of the amplifier 220, as previously described. The output signal from the phase demodulator 224 is applied to a conventional level detector 326 and the output signal from the level detector 326 is applied to the common contact 328 of a single pole-single throw switch 330. A contact 332 of the switch 330 is connected to an enable input terminal 334 of a conventional squarewave generator 336 and to the input terminal 262 of the electronic switch 258. The output signal from the squarewave generator 326 is applied to the input terminal 234 of the electronic switch 232, the input terminal 322 of the switch 318, to an input terminal 205 of the switch 204 and to inhibit terminals 305 and 307 of the subtractors 306 and 308.

In operation, the electronic switches 204, 232, 258 and 318 are not enabled and the subtractor 306 not inhibited when the switch 330 is open and the laser 200 is modulated by the output signal from the oscillator 244. The detector 310 detects the amplitude modulation of the transmitted laser beam 210 and, through the use of the phase lock circuit 306, provides a reference signal having a frequency equal to the difference between the frequency $f_1$ of the transmitted signal and the frequency $f_o$ of the signal from the oscillator 294.

This reference signal $f_o$ is applied to the mixer 216 by way of the switch 318 and is there mixed with the detected modulation of the reflected laser energy. The output signal from the mixer 216 is thus the output signal from the oscillator 294 phase-shifted by an amount equal to the phase shift between the transmitted and received energy. The output signal from the mixer 216 is amplified and applied to the phase demodulator 228 where it is compared to the signal from the oscillator 294. The output signal from the demodulator 228, a signal related to the phase difference between the transmitted and received wave energy, is applied to the automatic frequency control circuit 242 which, in turn, varies the frequency of the oscillator 244 until phase lock is detected, i.e., until the output signal of the phase demodulator 228 is nulled.

At the same time, the phase demodulator 254 compares the output signal from the oscillator 244 with the output signal from the oscillator 270. The output signal from the phase demodulator 254 is related to the phase difference between the oscillator 244 and 270 output signal and is applied through the switch 258 to the automatic frequency control 268 which varies the frequency of the oscillator 270 until the desired equal frequency relationship between the signals from the oscillator 244 and the oscillator 270 exists.

The "read" switch 330 may then be closed and the output signal from the level detector 326 utilized to enable the switch 258 and the squarewave generator 336. The switches 232, 204 and 318 and the subtractors 306 and 308 are enabled for 50 percent of each cycle of the squarewave generator output signal and the signals from the oscillators 244 and 270 are applied to the laser 200 via the switch 204 to modulate the transmitted beam 50 percent of the time. In addition, the output signal from the phase demodulator 228 is applied to the automatic frequency control circuits 242 and 268 50 percent of the time through the electronic switches 232 and 258. The 50 percent alternate switching thus renders the enabling of the $f_1$ and $f_2$ circuits mutually exclusive.

The automatic frequency control unit 268 is designed so that the gain phase thereof is 180° out of phase with the gain phase of the automatic frequency control unit 242. Thus, the frequency of the output signal of the oscillator 270 is shifted from the frequency $f_1$ to a frequency $f_2$ which provides a phase lock condition at the next successive or adjacent null.

The squarewave generator 336 controls the modulation of the laser 200 in this manner as long as the switch 330 is closed. Thus, the laser 200 is modulated 50 percent of the time by the signal from the oscillator 244 and for the other 50 percent by the signal from the oscillator 270. Due to the gain phase relationship between the automatic frequency control circuits 242 and 268, the frequencies of the signals from the oscillators 244 and 270 differ by a difference frequency $\Delta f$.

The amplitude modulation signal of the transmitted and received energy for 50 percent of the time period of one cycle of the squarewave signal, i.e., during the "off" period of each cycle of the squarewave signal, may be expressed, respectively, as equations (2) and (3). The phase difference between the transmitted and received signals during this same 50 percent of the time may be expressed by equation (5).

The other 50 percent of the time period, i.e., during the "on" period of each cycle of the squarewave signal the transmitted and received modulation signals, respectively, may be expressed by:

$$E_{t2} = A_{t2} \sin 2\pi f_2(t); \qquad (13)$$

and, $$E_{r2} = A_{r2} \sin 2\pi f_2 (t - 2d/c); \qquad (14)$$

The phase difference between the detected modulation of the transmitted and received energy during this "on" period of each cycle of the squarewave signal may be expressed as:

$$2\pi f_2 (2d/c) = (2N + 1)\pi/2 \pm \pi \qquad (15)$$

By obtaining equations (4) and (15) in terms of the frequencies $f_1$ and $f_2$, and by taking the difference between $f_1$ and $f_2$, a frequency $\Delta f$ corresponding to equation (8) results. Thus, distance may be expressed as in equation (9).

By utilizing the difference frequency $\Delta f$ to generate a time gate T, as previously described in connection with equations 10 – 13, the distance "d" may be displayed on the digital readout unit 292.

By way of the above described embodiments, it is clear that the distance between two predetermined locations may be determined without the problems associated with previous phase difference measuring systems. By obtaining a phase lock, the fractional portion of the wavelength unit may be eliminated. The number of integral wavelength units may easily be determined by counting the nulls between the two frequencies. The distance between the two predetermined locations may thus be stated simply as a function of the difference frequency which is easily and accurately determined.

Another embodiment of the distance measuring system of the present invention is illustrated in FIG. 4 wherein like numerical designations have been utilized to indicate elements previously described in connection with FIGS. 1–3.

Referring to FIG. 4, the transmitter unit 10 may be identical to that described in connection with FIGS. 1 and 2 and, therefore, will not be described in detail. The detected modulation signal from the detector 42 is applied through the amplifier 48 to input terminals 340 and 342 of suitable conventional mixers 344 and 346. The output signals from the mixers 344 and 346 are applied, respectively, through suitable conventional low pass filter circuits 348 and 350 to the input terminals 352 and 354 of suitable automatic frequency control (AFC) circuits 356 and 358. The mixer 344 and the filter 348, and the mixer 346 and the filter 350, function as a phase demodulator having a d.c. output signal related to the phase difference between the applied input signals.

The output signal from the AFC circuits 356 and 358 are applied, respectively, to the variable, voltage controlled oscillators 244 and 270. The output signal from the voltage controlled oscillator 244 is applied to one input terminal 362 of a suitable conventional mixer 364, to one input terminal 366 of a suitable conventional electronic gating circuit 368, and to a second input terminal 341 of the demodulator 344. The output signal from the gating circuit 368 is applied to one input terminal 373 of a conventional analog summing circuit 374 and the output signal from the summing circuit 374 is applied through the amplifier 74 to the modulator 32.

The output signal from the voltage controlled oscillator 270 is applied to a second input terminal 363 of the mixer 364, to a common contact 376 of the switch 372 and to a contact 378 of the switch 376 through an inverting amplifier 380.

The contact 382 of the switch 372 is connected to a second input terminal 384 of the summing circuit 374 and to a trigger input terminal 386 of a suitable conventional monostable or one-shot multivibrator 388. The second common contact 390 of the switch 372 is connected to a second input terminal 343 of the mixer 346.

The output signal from the mixer 364 is applied through the filter 76 to the digital processor and display unit 14 together with the output signal from the oscillator 92 to provide a direct, digital distance readout. The digital processor and display unit 14 of FIG. 4 may be identical to that described in connection with FIGS. 1 and 2 and need not, therefore, be described in detail.

In operation, the switch 372 is initially in the position illustrated, the gating circuit 368 is enabled, and the signal from the voltage controlled oscillator 244 is applied to the modulator 32 to modulate the laser beam 36. The modulation signal of the returned signal is detected by the detector 42 and applied through the amplifier 48 to the two phase demodulators where this signal is compared in phase to the signal from the oscillators 244 and 270 as applied respectively via the input terminals 341 and 343. Thus, with the switch 372 in the position illustrated, the detected modulation signal is compared in phase to the signal from the oscillators, and the d.c. output signals from the demodulators representative of the phase difference are filtered to remove any a.c. components and applied to the AFC circuits 356 and 358 to phaselock the oscillators 244 and 270 at the same frequency.

When the position of the switch 372 is changed to perform a distance measurement, the multivibrator 388 is triggered and disables the gating circuit 368 for a short period of time, e.g., 1 millisecond or less. During this brief period of time, only the signal from the oscillator 270 is utilized to modulate the laser beam 36. The signal from the oscillator 270 is inverted through the amplifier 380 and applied to the mixer 346 and there compared with the detected modulation signal. Since a 180° phase shift is introduced by the amplifier 380, the phase demodulator in that channel provides a d.c. output signal which, when applied to the AFC circuit 358, changes the frequency of the oscillator 270 until a phase lock at 90° is achieved.

When the multivibrator 388 resumes its normal state, the signals from both oscillators 244 and 270 are applied to the analog summing circuit 374 and the laser beam is modulated by a composite signal related in frequency to the frequencies of both oscillators 244 and 270. This modulation signal is detected and applied to the two-phase demodulators and compared, respectively, with the signals from the oscillators 244 and 270. The resultant d.c. output signals from the filters 348 and 350 maintain the frequencies of the respective oscillators 244 and 270 at frequencies given by equations (6) and either (7A) or (7B), respectively.

The signals from the oscillators 244 and 270 are applied to the mixer 364 and the difference frequency $\Delta f$ is given by equation (8). This difference frequency $\Delta f$ and the signal from the oscillator 92 having a predetermined frequency $f_0$ are applied to the digital processor and display unit 14 to provide a display of distance as was previously described in connection with FIGS. 1 and 2.

Thus, with the embodiment of FIG. 4, a direct digit display of the distance $d$ between the two predetermined locations may be obtained by obtaining a phase lock with a first oscillator while a second non-transmitting oscillator is slaved thereto, modifying the frequency of the signal from the second oscillator to obtain a related phase lock condition while utilizing both oscillators to modulate the transmitted signal, and utilizing the difference in the frequency of the two oscillators to gate clock pulses to a suitable digital distance display.

Numerous changes and modifications may be made in the specific embodiments of the present invention without departing from the true spirit or essential characteristics thereof. Those skilled in the difficult art of electronic distance measuring and familiar with the disclosure of this invention may well recognize additions, deletions, substitutions or other modifications with reference to the disclosed techniques. The disclosed techniques are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. Apparatus for measuring the distance between two geographically separated locations comprising
    means including a first variable frequency oscillator for transmitting wave energy at a first frequency from one of such locations to the other, means at the one location for detecting the wave energy reflected from the other location, means for varying the frequency of said first oscillator until a preascertained phase relationship is obtained between the transmitted wave energy and the detected wave energy, means including a second variable frequency oscillator for transmitting wave energy from one of such locations to the other, means for varying the frequency of said second oscillator with respect to the frequency of said first oscillator, until a preascertained phase relationship is obtained between the transmitted wave energy of the second oscillator and the detected wave energy returned from the other location, latter phase relationship being different frequency-wise from the phase relationship associated with said first oscillator, thus establishing a predetermined integral multiple of one-half wavelengths difference between the number of wavelengths of the first and second frequencies, means for subtracting the smaller from the larger of the two frequencies to obtain a resultant difference frequency inversely proportional to the distance between the first and second locations, means for converting the difference frequency into a count accurately representative of the distance between the two locations, and means for indicating the distance between the two locations.

2. The apparatus of claim 1 wherein said means for indicating the distance includes means for generating an electrical signal related in frequency to the difference between the first and second frequencies of the transmitted wave energy; and means responsive to said electrical signal for digitally displaying the distance between the two predetermined locations.

3. The apparatus of claim 1 wherein said transmitting means includes:

means for generating a continuous wave carrier beam of wave energy; and modulator means for amplitude modulating said continuous wave carrier beam of wave energy responsively to an applied modulating signal.

4. The apparatus of claim 3 wherein said means for detecting the wave energy comprises detector means for detecting the amplitude modulation of said continuous wave carrier beam.

5. Apparatus for measuring the distance between two geographically separated locations comprising a pair of variable frequency oscillators, means including a first of said oscillators for transmitting wave energy at a first frequency from one of said locations to the other, means at the one location for detecting the wave energy reflected from the other location, means for varying the frequency of said first oscillator until a phase null is obtained between the transmitted wave energy and the detected wave energy, means for bringing the second oscillator to the frequency of said first oscillator, means for varying the frequency of said second oscillator while holding fixed the frequency of said first oscillator, until a phase null is obtained between the transmitted wave energy of the second oscilla-
tor and the detected wave energy returned from the other location, latter phase null being different frequency-wise from the phase null associated with said first oscillator, thus establishing a predetermined integral multiple of one-half wavelengths difference between the number of wavelengths of the first and second frequencies, means for subtracting the smaller from the larger of the two frequencies to obtain a resultant difference frequency inversely proportional to the distance between the first and second locations, means for applying a time gate to a stable oscillator, said time gate being one or more cycles of the difference frequency, and means for counting the number of cycles of the gated frequency output from said stable oscillator, and for indicating in a highly accurate manner, the distance between the two locations.

6. The apparatus of claim 5 wherein said means for indicating the distance includes:

means for generating an electrical signal related in frequency to the difference between said first and said second frequencies of the wave energy; and means responsive to said electrical signal for digitally displaying the distance between the two predetermined locations.

7. The apparatus of claim 6 wherein said transmitting means includes:

means for generating a continuous wave carrier beam of wave energy; and, modulator means for amplitude modulating said continuous wave carrier beam of wave energy respectively to an applied modulating signal.

8. A method of providing a digital readout of the distance between two predetermined locations comprising the steps of:

transmitting wave energy from one of the predetermined locations toward the other of the predetermined locations, detecting at said one of the predetermined locations the wave energy returned from said other of the predetermined locations, establishing a predetermined phase relationship between the transmitted and detected wave energy at a first frequency of the wave energy, establishing a predetermined phase relationship between the transmitted and detected wave energy at a second frequency of the wave energy, such transmitting of wave energy being a rapid alternate transmission of wave energy at the two frequencies, while maintaining both frequencies in the desired predetermined phase relationship, subtracting the frequency of one of the first and second wave energy from the frequency of the other of the first and second wave energy to obtain a differing frequency.

generating an electrical signal having a predetermined frequency, and gating the electrical signal to a counter responsively to the difference frequency to thereby provide a digital readout of the distance between the two predetermined locations.

9. The method of claim 8 including the steps of dividing the difference frequency by a predetermined integer and gating the electrical signal to the counter responsively thereto.

10. The method of claim 8 wherein the varying of the frequency of the transmitted wave energy includes the generation of a second wave energy signal during a common time period.

11. The method of claim 8 wherein the difference frequency is obtained by:
storing a number related to the number of cycles of one of the first and second frequency wave energy during a first period of time;
reducing the stored number by a number related to the number of cycles of the other of the first and second frequency wave energy during a second period of time of the same duration as the first period of time.

12. A method of measuring the distance between two predetermined locations comprising the steps of:
transmitting a carrier beam of wave energy from one of the predetermined locations toward the other of the predetermined locations,
generating first and second modulating signals having selectively variable frequencies,
modulating the carrier beam respectively to the first and second modulating signals,
detecting the modulation of the carrier beam returned from the other of the predetermined locations,
alternately modulating at a very rapid rate, the carrier beam respectively to both the first and second modulating signals,
varying the frequencies of the first and second modulating signals to obtain predetermined phase relationships of the modulating signals and the detected modulation of the carrier beam,
subtracting and dividing the first and second frequencies to obrain a time gate,
applying such time gate to a stable oscillator and counting the stable oscillator cycles in the gate, and
indicating the distance between the two predetermined locations responsively to the number of cycles counted.

13. A method of measuring the distance between two predetermined locations comprising the steps of:
obtaining a phase lock with a transmitting first oscillator while a second non-transmitting oscillator is slaved thereto,
modifying the frequency of the second oscillator to obtain a related phase lock while modulating the transmitted signal alternately with both oscillators on a very rapid basis, and,
utilizing the difference in frequency of the oscillators to gate clock pulses to a digital display.

14. Apparatus for accurately measuring the distance between two geographically separated locations comprising
means for transmitting a wave energy signal at a first selected frequency from a first location to a second location,
means at the second location for reflecting the transmitted wave energy back from such second location to the first location,
means at the first location for receiving and detecting the signal reflected from said reflector means,
means for adjusting the frequency of the first transmitted signal by the use of a phase comparison means such that an integral number of quarter wavelengths exist over the distance from the source to the reflector means and back,
means for transmitting a second wave energy signal, from such first location to said reflector means at a second frequency, said second frequency bearing a preascertained relationship to said first frequency,
means for adjusting the frequency of the second signal such that an integral number of quarter wavelengths exist over the distance from such first location to said reflector means and back, which is one half wavelength greater or less than the number of wavelengths at the first frequency,
means for holding substantially constant the phase relationships of the first and second frequencies while rapidly alternating the transmission between the first and second frequencies, thereby making both frequencies simultaneously available for processing for distance measurement,
means for subtracting the smaller frequency from the larger of the two frequencies so as to obtain and identify a difference frequency inversely proportional to the distance between such first location and said reflector means, without it being necessary to establish the numerical frequency of either the first frequency or the second frequency,
means for dividing such difference frequency by a selected constant so as to obtain a time gate,
means for applying such time gate to stable oscillator means to obtain a count directly proportional to distance, and,
means for displaying such count on an indicating means, thus to represent precisely the distance between the first location and the second location.

15. A method of accurately determining the distance between a source of wave energy and a distant reflector of such energy comprising the steps of
transmitting a wave energy signal at a first selected frequency from the source to the reflector,
receiving and detecting the signal reflected from said reflector,
adjusting the frequency of the first transmitted signal by the use of a phase comparison procedure such that an integral number of quarter wavelengths exist over the distance from the source to the reflector and back,
utilizing a second wave energy signal, transmitted from such source to the reflector at a second frequency, said second frequency bearing a preascertained relationship to said first frequency,
adjusting the frequency of the second signal such that an integral number of quarter wavelengths exist over the distance from source to reflector and back, which is one half wavelength greater or less than the number of wavelengths at the first frequency,
transmitting the first and second frequencies alternately while operating on each to hold the phase relationships essentially constant, thereby making both frequencies simultaneously available for processing to obtain distance measurement,
subtracting the smaller frequency from the larger of the two frequencies so as to obtain and identify a difference frequency inversely proportional to the distance between source and reflector, without it being necessary to establish the numerical frequency of either the first frequency or the second frequency, dividing such difference frequency by a selected constant so as to obtain a time gate, applying such time gate to a stable oscillator to obtain a count directly proportional to distance, and, displaying the count on an indicating means, thus to represent precisely the distance between the source and the reflector.

16. An electronic distance measuring device for determining the distance between two geographically spaced locations utilizing wave energy, comprising means for transmitting wave energy from one location to the other, means at said one location for detecting the wave energy reflected back from said other location and for comparing same in phase with the transmitted wave energy, means for varying the phase relationship between the transmitted and detected energy until a predetermined phase lock relationship exists, said means for transmitting wave energy then transmitting wave energy from the one location to the other at a different frequency until a predetermined phase lock realtionship exists at such different frequency, means for accomplishing a rapid alternate trnasmission of the two frequencies, while maintaining both frequencies in the desired phase lock conditions, means for subtracting one of such frequencies from the other to obtain a difference frequency, such difference frequency then being utilized for providing a direct indication of distance between the two geographically spaced locations.

* * * * *